(12) United States Patent
Guo

(10) Patent No.: US 8,558,810 B2
(45) Date of Patent: Oct. 15, 2013

(54) TOUCH MOUSE

(75) Inventor: Xin Guo, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 38 days.

(21) Appl. No.: 13/334,068

(22) Filed: Dec. 22, 2011

(65) Prior Publication Data

US 2013/0021271 A1    Jan. 24, 2013

(30) Foreign Application Priority Data

Jul. 21, 2011   (CN) .......................... 2011 1 0204984

(51) Int. Cl.
*G06F 3/041*    (2006.01)
*G06F 3/033*    (2013.01)
*G09G 5/00*    (2006.01)

(52) U.S. Cl.
USPC ............................. 345/173; 345/156; 345/179

(58) Field of Classification Search
None
See application file for complete search history.

(56) References Cited

U.S. PATENT DOCUMENTS

| | | | | |
|---|---|---|---|---|
| 4,980,518 A | * | 12/1990 | Kobayashi et al. | 178/18.04 |
| 5,750,941 A | * | 5/1998 | Ishikawa et al. | 178/19.02 |
| 6,111,565 A | * | 8/2000 | Chery et al. | 345/179 |
| 2002/0056575 A1 | * | 5/2002 | Keely et al. | 178/18.01 |
| 2011/0267266 A1 | * | 11/2011 | Xiang | 345/157 |

* cited by examiner

*Primary Examiner* — Kent Chang
*Assistant Examiner* — Evelio Hernandez
(74) *Attorney, Agent, or Firm* — Altis & Wispro Law Group, Inc.

(57) ABSTRACT

A touch device includes a touch panel, a stylus, a measuring wave transmitter sleeved the stylus and transmitting measuring waves, a frame surrounding the touch panel, three sensors embedded in the frame, and a processor electrically connected to the three sensors. The processor stores a coordinate system and location points of the three sensors, and calculates a location point $(x, y)$ of the stylus according to $\sqrt{(x-x11)^2+(y-y11)^2} = \sqrt{(x-x12)^2+(y-y12)^2} - \Delta T1 \times V = \sqrt{(x-x13)^2+(y-y13)^2} - \Delta T2 \times V$, wherein $\Delta T1$ is time interval between a first time point when one sensor receives the measuring waves and a second time point when another sensor receives the measuring waves, $\Delta T2$ is time interval between the first time point and a third time point when the remaining sensor receives the measuring waves, $(x11, y11)$, $(x12, y12)$, $(x13, y13)$ are location points of the sensors receiving the measuring waves at the first, second and third time points, V is transmitting speed of the measuring waves.

12 Claims, 3 Drawing Sheets

TOUCH MOUSE

BACKGROUND

1. Technical Field

The present disclosure relates to touch mice and, particularly, to a touch mouse having at least one touch device.

2. Description of Related Art

Electronic devices (such as notebook computers) have touch mice. Each of the touch mice has a touch panel. However, the touch panel needs to be pressed hard to generate electrical signals, and thus the touch panel is easily damaged.

Therefore, it is desirable to provide a touch mouse that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
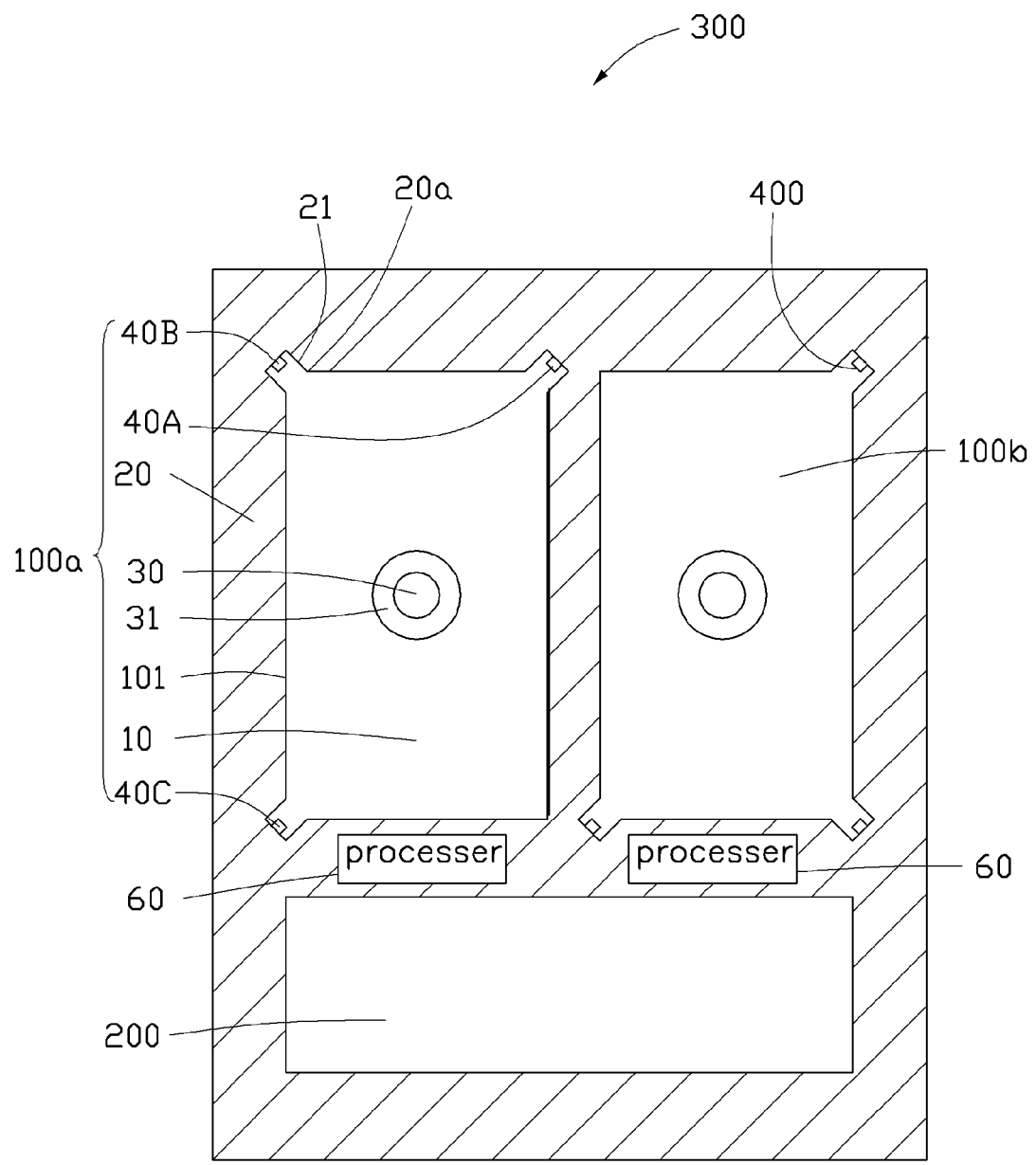
FIG. 1 is a schematic, isometric view of a touch mouse, according to an exemplary embodiment.

Referring to FIG. 1, a touch mouse 300, according to an embodiment, includes a first touch device 100a, a second touch device 100b, and a wrist support plate 200. The first touch device 100a and the second touch device 100b are arranged on a side of the wrist support plate 200 side by side, and are used for implementing functions of a left mouse-click and a right mouse-click respectively. The wrist support plate 200 is used for supporting a wrist of a user. The configuration of the first touch device 100a is identical to that of the second touch device 100b. In other embodiments, the wrist support plate 200 can be omitted.

The first touch device 100a includes a touch panel 10, a frame 20, a stylus 30, a ring-shaped measuring wave transmitter 31, a first sensor 40A, a second sensor 40B, a third sensor 40C, and a processor 60.

The frame 20 surrounds the touch panel 10 and forms a receiving space 101 above the touch panel 10. The stylus 30 slides in the receiving space 101. The measuring wave transmitter 31 sleeves the stylus 30, and is used for transmitting measuring waves radially and parallel to the touch panel 10. The frame 20 is made of a material, which breaks the transmission of the measuring wave, so that the measuring wave in the first touch device 100a will not influence the second touch device 100b. In this embodiment, the measuring waves are infrared rays at a certain frequency. In other embodiments, the measuring waves may be ultrasonic waves or electromagnetic waves at a certain frequency.

The three sensors 40A, 40B, 40C are embedded in the frame 20. When the stylus 30 perpendicularly contacts with the touch panel 10, the three sensors 40A, 40B, 40C are aligned with the measuring wave transmitter 31 for receiving the measuring waves. In one embodiment, the frame 20 is substantially rectangular, and has four corners 20a. Three corners of the four corners 20a define a groove 21 respectively communicating with the receiving space 101. The three sensors 40A, 40B, 40C are respectively received in the three grooves 21. Each of the three sensors 40A, 40B, 40C has a sensing surface 400 perpendicular to the touch panel 10 and forms a 135° angle with two adjacent perpendicular edges of the frame 20.

Each of the three sensors 40A, 40B, 40C is used for generating a square wave signal according to the measuring waves. In one embodiment, each of the three sensors 40A, 40B, 40C generates a square wave signal of high-level "1" when a respective one of the three sensors 40A, 40B, 40C receives the measuring waves. Each of the three sensors 40A, 40B, 40C generates a square wave signal of low-level "0" when a respective one of the three sensors 40A, 40B, 40C does not receive the measuring waves.

Figure 2:
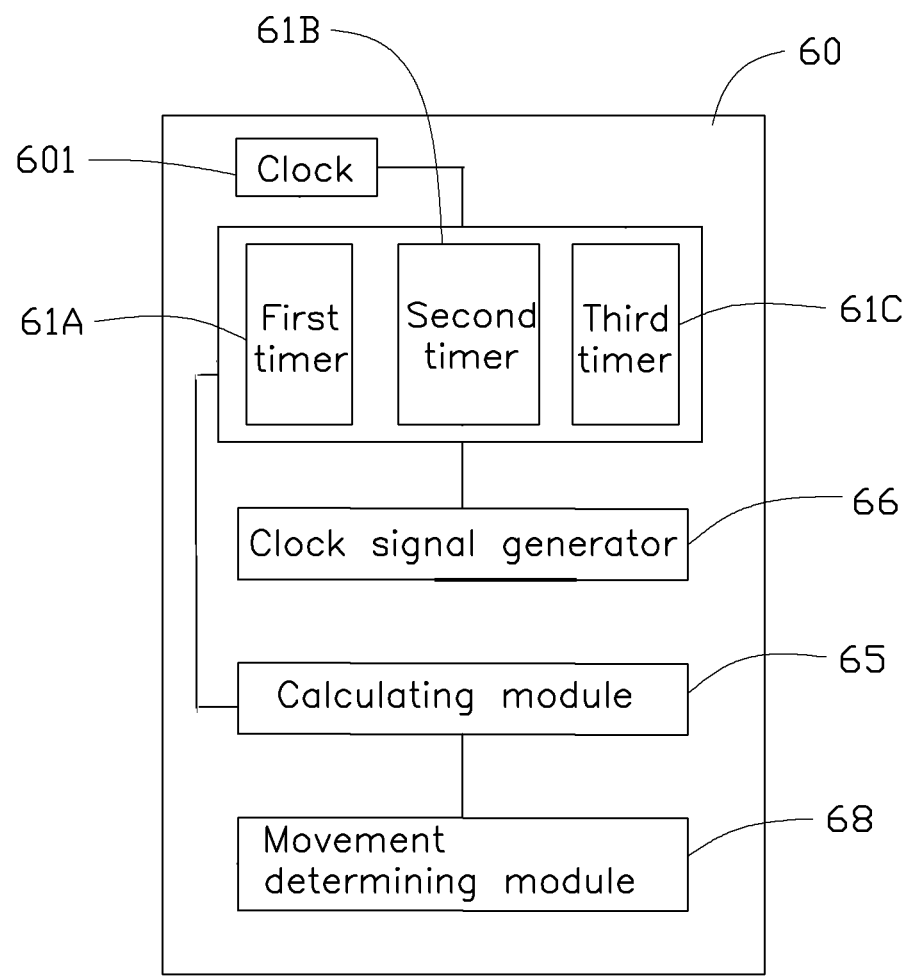
FIG. 2 is a schematic block diagram of circuitry of the touch mouse of FIG. 1.

Also referring to FIG. 2, the processor 60 is used for determining the location point of the stylus 30 and the movement of the stylus 30. In addition, includes a clock 601, a first timer 61A corresponding to the first sensor 40A, a second timer 61B corresponding to the second sensor 40B, a third timer 61C corresponding to the third sensor 40C, a calculating module 65, a clock signal generator 66, and a movement determining module 68.

The timers 61A, 61B, 61C are electrically connected to the corresponding sensors 40A, 40B, 40C and the clock 601, and are used for recording the time points when the corresponding sensors 40A, 40B, 40C receive the measuring waves. The calculating module 65 is electrically connected to the three timers 61A, 61B, 61C, and is used for calculating time intervals $\Delta T1$, $\Delta T2$. The time interval $\Delta T1$ is the time interval between the time point when one of the sensors 40A, 40B, 40C receives the measuring waves first, and the time point when another one of the sensors 40A, 40B, 40C receives the measuring waves second. In addition, the time interval $\Delta T2$ is the time interval between the time point when one of the sensors 40A, 40B, 40C receives the measuring waves first and the time point when the remaining one of the sensors 40A, 40B, 40C receives the last measuring waves.

During the process of the stylus 30 sliding on the touch panel 10, all of the three sensors 40A, 40B, 40C have a chance to receive the measuring waves first. For convenience, in this embodiment, a first situation of the first sensor 40A first receiving the measuring waves is described. A situation of the second sensor 40B or the third sensor 40C first receiving the measuring waves is substantially similar to the first situation.

When the first sensor 40A receives the measuring waves at 8:01, the first timer 61A records 8:01. When the second sensor 40B receives the measuring waves at 8:06, the second timer 61B records 8:06. When the third sensor 40C receives the measuring waves at 8:09, the third timer 61C records 8:09. Then the calculating module 65 subtracts the time point of the first timer 61A from the time points of the second timer 61B and the third timer 61C, obtaining the first time interval $\Delta T1=8:06-8:01=5$ second (s), and the second time interval $\Delta T2=8:09-8:01=8$ s.

The calculating module 65 is further used for calculating the distances L1, L2 that the measuring wave is transmitted during the time interval $\Delta T1$, $\Delta T2$, $L1=V\times\Delta T1$, $L2=V\times\Delta T2$, wherein V is the transmitting speed of the measuring waves in the air.

Figure 3:
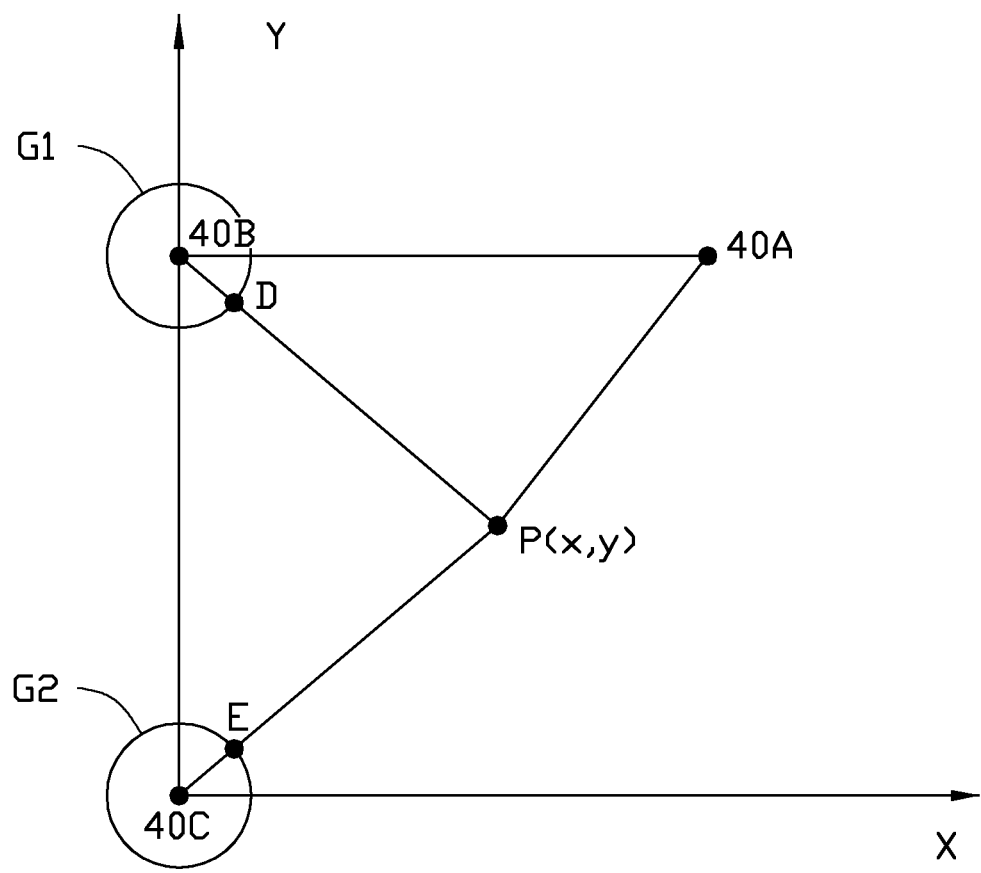
FIG. 3 is a schematic view of a coordinate system stored in a processor of the touch mouse of FIG. 1.

Referring to FIG. 3, the calculating module 65 is further used for calculating the location point of the stylus 30. In one embodiment, the calculating module 65 stores a coordinate system and three locating points (x11, y11), (x12, y12), (x13, y13) of the three sensors 40A, 40B, 40C in the coordinate system. In this embodiment, the coordinate system takes the two perpendicular edges of the frame 20 as the X axis and the Y axis respectively, and the touch panel 10 of the first touch device 100a is in a first quadrant of the coordinate system. A touch panel 10 of the second touch device 100b is in a second quadrant of the coordinate system.

The stylus 30 is at point P (x, y). A first circle G1 is made taking the location point of the second sensor 40B as a center and taking the distance L1 as a radius. A second circle G2 is made taking the location point of the third sensor 40C as a center and taking the distance L2 as a radius. The first circle G1 and the straight line connected between the point P and the sensor 40B intersects at point D. The circle G2 and the straight line connected between the point P and the sensor 40C intersects at point E. Then the distance from the point P to the sensor 40A is equal to the distance from the point P to the point D, and equal to the distance from the point P to the point E, that is, $\sqrt{(x-x11)^2+(y-y11)^2}=\sqrt{(x-x12)^2+(y-y12)^2}-L1=\sqrt{(x-x13)^2+(y-y13)^2}-L2$.

The calculating module 65 of the first touch device 100a takes the calculated locating point at the first quadrant as the location of the stylus 30. The calculating module 65 of the second touch panel 100b takes the calculated point at the second quadrant as the location of the stylus 30.

The clock signal generator 66 is used for controlling the three timers 61A, 61B, 61C to work once every a predetermined time interval, and thus the calculating module 65 calculates a number of location points of the stylus 30, and connects the location points of the stylus 30 successively to obtain the sliding trace of the stylus 30.

The movement determining module 68 stores a predetermined number of the high-level "1". If the number of continuous high-level "1" generated by the first sensor 40A receiving the measuring waves first is larger than the predetermined number of the high-level "1", and the two adjacent location points of the stylus 30 are different, then the movement determining module 68 determines that the stylus 30 is sliding. If the number of the continuous high-level "1" generated by the first sensor 40A is larger than the predetermined number of the high-level "1", and the two adjacent location points of the stylus 30 are the same, then the movement determining module 68 determines the stylus 30 is stopped on a point. If the number of the continuous high-level "1" generated by the first sensor 40A is less than the predetermined number of the high-level "1", then the movement determining module 68 determines the stylus 30 is clicking on the touch panel 10.

In use of the first touch device 100a, the three timers 61A, 61B, 61C and the calculating module 65 cooperate to obtain the location point of the stylus 30, the clock signal generator 66 controls the three timers 61A, 61B, 61C to work once every the predetermined time interval, and thus the calculating module 65 calculates a number of location points of the stylus 30, and connects the calculated location points successively to simulate the sliding trace of the stylus 30. The movement determining module 68 determines whether the stylus 30 clicks on the touch panel 10. The working process of the second touch device 100b is the same as that of the first touch device 100a.

In the process of the touch mouse 300, the stylus 30 only contacts with the touch panel 10, and does not need to press the touch panel 10 hard, and thus the touch panel 10 can be protected effectively.

It will be understood that the above particular embodiments are shown and described by way of illustration only. The principles and the features of the present disclosure may be employed in various and numerous embodiments thereof without departing from the scope of the disclosure as claimed.

The above-described embodiments illustrate the scope of the disclosure but do not restrict the scope of the disclosure.

What is claimed is:

1. A touch device comprising:
   a touch panel;
   a stylus configured for sliding on the touch panel;
   a ring-shaped measuring wave transmitter sleeved over the stylus, the measuring wave transmitter being configured for radially transmitting measuring waves parallel to the touch panel when the stylus touches the touch panel;
   a frame surrounding the touch panel and made of a material which blocks the transmission of the measuring waves;
   three sensors embedded in the frame for receiving the measuring waves, each of the three sensors configured for generating a square wave signal of high-level "1" when receiving the measuring waves, each of the three sensors configured for generating a square wave signal of low-level "0" when not receiving the measuring waves;
   a processor electrically connected to the three sensors, and storing a coordinate system and three location points of the three sensors, the processor being configured for calculating a time interval ΔT1 between a first time point when one of the three sensors receives the measuring waves first and a second time point when another one of the three sensors receives the measuring waves, and calculating another time interval ΔT2 between the first time point and a third time point when the remaining one of the three sensors receives the measuring waves, the processor being further configured for calculating a location point (x, y) of the stylus according to the following formula:

$$\sqrt{(x-x11)^2+(y-y11)^2}=\sqrt{(x-x12)^2+(y-y12)^2}-\Delta T1 \times V=\sqrt{(x-x13)^2+(y-y13)^2}-\Delta T2 \times V,$$

wherein (x11, y11) is a location point of the sensor receiving the measuring waves at the first time point, (x12, y12) is a location point of the sensor receiving the measuring waves at the second time point, (x13, y13) is a location point of the sensor receiving the measuring waves at the third time point, and V is a transmitting speed of the measuring waves in the air;
   wherein the processor stores a predetermined number of high level "1", when the number of high-levels "1" continuously generated by a particular one of the three sensors is less than the predetermined number of high level "1", the processor determines that the stylus clicks on a point of the touch panel; and when the number of high-levels "1" continuously generated by the particular one of the three sensors is larger than or equal to the predetermined number of high level "1, the processor determines that the stylus slides or stops on the touch panel.

2. The touch device of claim 1, wherein each of the three sensors has a sensing surface perpendicular to the touch panel and facing the stylus.

3. The touch device of claim 1, wherein the processor calculates the location point of the stylus once every a predetermined time interval, when two adjacent location points of the stylus are different, the processor determines that the stylus is sliding on the touch panel and connects the location points of the stylus to simulate a sliding trace of the stylus; when two adjacent location points of the stylus are same, the processor determines that the stylus stops on a point of the touch panel.

4. The touch device of claim 1, wherein the processor comprises a calculating module, three timers and a clock, the clock is in communication with the timers, each of the three timers is electrically connected to a respective sensor and is configure for recording the time point of the respective sensor receiving the measuring waves, the calculating module is configured for calculating the two time intervals ΔT1, ΔT2.

5. The touch device of claim 4, wherein the calculating module is further configured for calculating the location point of the stylus, the processor comprises a clock signal generator for controlling the three timers to work once every a predetermined time interval.

6. A touch mouse comprising:
at least one touch device, each of the at least one touch device comprising:
a touch panel;
a stylus configured for sliding on the touch panel;
a ring-shaped measuring wave transmitter sleeved over the stylus, the measuring wave transmitter being configured for radially transmitting measuring waves parallel to the touch panel when the stylus touches the touch panel;
a frame surrounding the touch panel and made of a material which blocks the transmission of the measuring waves;
three sensors embedded in the frame for receiving the measuring waves, each of the three sensors configured for generating a square wave signal of high-level "1" when receiving the measuring waves, each of the three sensors configured for generating a square wave signal of low-level "0" when not receiving the measuring waves;
a processor electrically connected to the three sensors, and storing a coordinate system and three location points of the three sensors, the processor being configured for calculating a time intervals ΔT1 between a first time point when one of the three sensors receives the measuring waves first and a second time point when another one of the three sensors receives the measuring waves, and calculating another time interval ΔT2 between the first time point and a third time point when the remaining one of the three sensors receives the measuring waves, the processor being further configured for calculating a location point (x, y) of the stylus according to the following formula:

$$\sqrt{(x-x11)^2+(y-y11)^2} = \sqrt{(x-x12)^2+(y-y12)^2} - \Delta T1 \times V = \sqrt{(x-x13)^2+(y-y13)^2} - \Delta T2 \times V,$$

wherein (x11, y11) is a location point of the sensor receiving the measuring waves at the first time point, (x12, y12) is a location point of the sensor receiving the measuring waves at the second time point, (x13, y13) is a location points of the sensor receiving the measuring waves at the third time point, and V is a transmitting speed of the measuring waves in the air;
wherein the processor stores a predetermined number of high level "1", when the number of high-levels "1" continuously generated by a particular one of the three sensors is less than the predetermined number of high level "1", the processor determines that the stylus clicks on a point of the touch panel; and when the number of high-levels "1" continuously generated by the particular one of the three sensors is larger than or equal to the predetermined number of high level "1, the processor determines that the stylus slides or stops on the touch panel.

7. The touch mouse of claim 6, wherein the touch mouse comprises two touch devices configured for implement functions of a left mouse-click and a right mouse-click respectively.

8. The touch mouse of claim 6, wherein each of the three sensors has a sensing surface perpendicular to the touch panel and facing the stylus.

9. The touch mouse of claim 6, wherein the processor calculates the location point of the stylus once every a predetermined time interval, when two adjacent location points of the stylus are different, the processor determines that the stylus is sliding on the touch panel and connects the location points of the stylus to simulate a sliding trace of the stylus; when two adjacent location points of the stylus are same, the processor determines that the stylus stops on a point of the touch panel.

10. The touch mouse of claim 6, wherein the processor comprises a calculating module, three timers and a clock, the clock is in communication with the timers, each of the three timers is electrically connected to a respective sensor and is configure for recording the time point of the respective sensor receiving the measuring waves, the calculating module is configured for calculating the two time intervals ΔT1, ΔT2.

11. The touch mouse of claim 10, wherein the calculating module is further configured for calculating the location point of the stylus, the processor comprises a clock signal generator for controlling the three timers to work once every a predetermined time interval.

12. The touch mouse of claim 6, wherein the touch mouse further comprises a wrist support plate on a side of the at least one touch device and configured for supporting a wrist of a user.

* * * * *